July 14, 1964     A. E. LUND     3,140,913
WOOD COATED WITH A BENZANTHRONEACRIDINE USED
AS A WOODPECKER REPELLENT
Filed Aug. 15, 1962
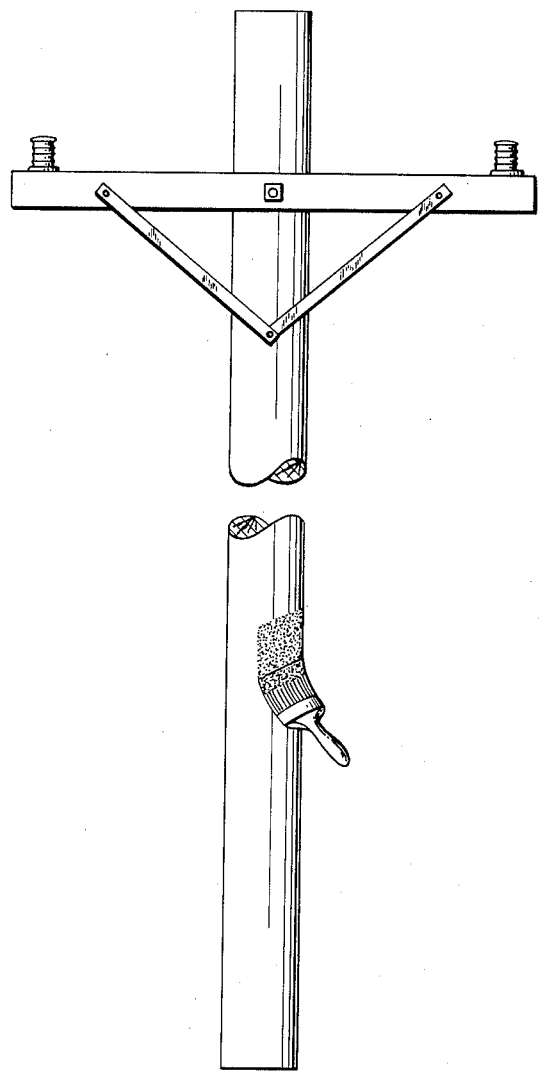
INVENTOR.
ANDERS E. LUND
BY Oscar B Brumback
his Attorney

United States Patent Office 3,140,913
Patented July 14, 1964

3,140,913
WOOD COATED WITH A BENZANTHRONEACRI-
DINE USED AS A WOODPECKER REPELLENT
Anders E. Lund, Pitcairn, Pa., assignor to Koppers
Company, Inc., a corporation of Delaware
Filed Aug. 15, 1962, Ser. No. 216,989
2 Claims. (Cl. 8—6.5)

This invention relates to a method of protecting wood products from attack by woodpeckers and more specifically to novel wood products having woodpecker repellent characteristics.

There is a great need for an effective and relatively inexpensive method of preventing woodpecker attack on wood products such as standing utility poles. Great economic waste, for example, is occasioned by the attack of woodpeckers causing injury and destruction of valuable standing transmission and distribution utility poles. Copending application Serial No. 195,676, now U.S. Patent 3,103,449, of John V. Dennis, Anders E. Lund and John M. Irvine, discusses in detail the problems that are involved in protecting utility poles from attack by woodpeckers and the attempts of prior workers in the art to solve these perplexing problems.

Quite unexpectedly it has now been discovered that woodpeckers can be repelled from wood surfaces that normally are subject to their attack by the presence of a benzanthroneacridine.

Benzanthroneacridines are well known vat-dyes. They are characterized by good, all-around fastness, a high affinity for cellulosic fibers and excellent vat solubility. They are generally in dull shades from blue-green to green to olive to brown and gray but are used extensively in the dyeing trade because they combine well with other colors. They are substantially odorless.

The benzanthroneacridines are described in Wolff, United States Patent No. 995,936. They are obtained by alcoholic caustic alkali fusion of 3-1(-anthraquinonylamino)benzanthrones at elevated temperatures. The simplest derivative being shown as follows:

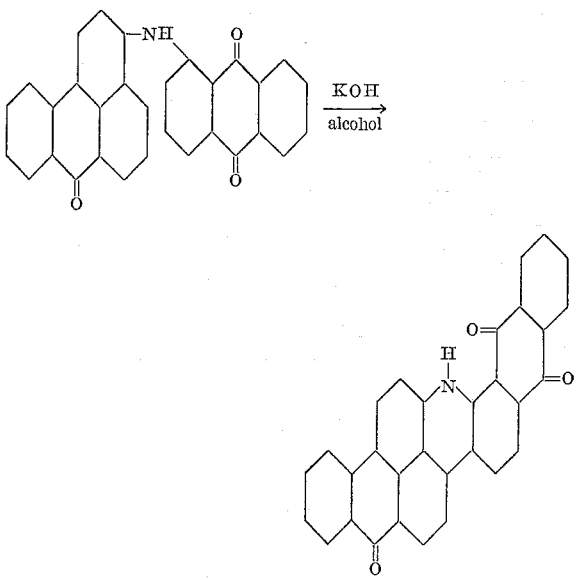

The fused mass is poured into water, and the reduced product oxidized and separated.

Substituted products can be prepared by utilizing substituted α-amino-anthraquinones instead of 1-aminoanthraquinone (as exemplified above), such as 1-amino-5-benzamidoanthraquinone, or an aminoanthraquinone to which a heterocyclic system is attached such as 5-amino-1,9-anthrapyrimidine. 3 - (1 - anthraquinonylamino)benzanthrones may be halogenated and the halogenated product condensed with α-aminoanthraquinones. These on fusion produce a series of dyes varying in shade from olive to brown.

Exemplary of the benzanthroneacridines used in the invention is that commercially used under the trademark Amanthrene Olive Green B and may be prepared by the condensation of 1 mole of 3-bromobenzanthrone and 1 mole aminoanthraquinone followed by the alkali fusion of the intermediate 3-(1-anthraquinonylamino)benzanthrone. Other useful benzanthroneacridines are shown in the table below wherein they are listed by the color index number and the intermediates from which the dye is prepared.

| Color Index | Component Intermediates |
|---|---|
| Vat Green 3 [1] | 3-Bromobenzanthrone (1 mole). 1-Aminoanthraquinone (1 mole). |
| Vat Green 5 | 3-Bromobenzanthrone (1 mole). 1-Amino-5-benzamidoanthraquinone (1 mole). The benzanthroneacridine chlorinated. |
| Vat Green 17 | 3-Bromobenzanthrone (1 mole). 1,5-Diaminoanthraquinone (1 mole). The benzanthroneacridine benzoylated. |
| Vat Green 7 | 3,9-Dibromobenzanthrone (1 mole). 1-Aminoanthraquinone (2 moles). The benzanthroneacridine treated with SOCl₂ and AlCl₃. |
| Vat Black 25 [1] | 3,9-Dibromobenzanthrone (1 mole). 1-Aminoanthraquinone (2 moles). |
| Vat Blue 25 | 3-Bromobenzanthrone (1 mole). Anthra [1,9] pyrazol-6(2H)-one (1 mole). |
| Vat Black 8 | 3,9-Dibromobenzanthrone (1 mole). Anthra [1,9] pyrazol-6(2H)-one (1 mole). 1-Aminoanthraquinone (1 mole). |
| (69530) [2] | 3,9-Dibromobenzanthrone (1 mole). 1-Aminoanthraquinone (1 mole). 1-Amino-5-benzamidoanthraquinone (1 mole). |
| (69535) | 3,9-Dibromobenzanthrone (1 mole). 1-Aminoanthraquinone (1 mole). 1,5-Diaminoanthraquinone (1 mole). 1-Amino-2-anthraquinonecarbonyl chloride (1 mole). |

[1] 2nd ed., Color Index, vol. 4.
[2] 2nd ed., Color Index, vol. 3.

The woodpecker repellent of this invention can be applied as such to the wood or it can be combined with a carrier or other materials, for example, in solution or dispersion. Solvents or carriers can be used which are substantially compatible with respect to the active woodpecker repellent benzanthroeacridine. Examples of carrier materials which can be employed are:

Alkaline solutions containing sodium hydrosulfite;
Aqueous slurries.

If desired the benzanthroneacridine can be associated with the wood products of this invention by applying to the wood an aqueous solution of the benzanthroneacridine, which water soluble form is prepared by reducing the benzanthroneacridine in alkaline solution using sodium hydrosulfite as the reducing agent and subsequently oxidizing the benzanthroneacridine. The benzanthroneacridine can also be applied as a paste or powder, along with such solid carriers as kaolin or other clays. The benzanthroneacridine may also be applied to the surface of wood products as an aqueous dispersion.

Benzanthroneacridine may conveniently be applied to the wood products of this invention in any of the forms described above by spraying, brushing, dipping or pressure impregnating. The preferred method of application is by dipping the wood product in a tank containing the reducing bath of the benzanthroneacridine for a sufficient time to allow the surface to be coated with the material from the bath, removing the coated wood product from the bath and exposing the wood to air whereby the reduced form of benzanthroneacridine is oxidized back to its colored form.

When applying the woodpecker repellent of this invention in a solvent or solid carrier or in a dispersion form, the amount of benzanthroneacridine will vary with the particular method used, but the amount is not particularly critical. It has been found in practice, that when kaolin clay has been used to prepare pastes which contained about 4% by weight benzanthroneacridine, and these pastes were used to fill portions of distribution lines, previously damaged by woodpeckers, they were effective in repelling further attack by woodpeckers. On the other hand, when applying the repellent of this invention in reduceable solution or in a slurry or suspension of the unreduced material the liquid compositions will normally contain from 1 to about 10% of the benzanthroneacridine although concentrations above and below this range can be used. Thus, the concentration of benzanthroneacridine in the carrier or vehicle may vary widely dependent upon the method of application to the wood.

As an illustration of the invention in producing wood products having the characteristics of woodpecker repellency, a dip treating solution is made by stirring benzanthroneacridine in water until there is uniform dispersion. A wetting or dispersing agent may be added if desired. An equal weight of sodium hydrosulfite is generally added with continuous stirring. Sodium hydroxide may also be added to maintain a high pH value. Reduction will be complete in ten to fifteen minutes, when it is noted that a clear although usually different colored solution has been formed. The bath is now ready for dipping of the wood product, such as telephone transmission or electrical distribution poles. Upon removal of the dipped pole or post wood products from the bath (excess bath liquor is washed off), air oxidation begins and the reduced material contained on the wood product is oxidized to the benzanthroneacridine.

When a standing post has been damaged in the field, a convenient way to the repair of damaged areas of distribution and transmission poles and to prevent further attack and weakening of the pole in the area of original woodpecker damage, is to use a thick paste containing the benzanthroneacridine. Advantageously, the paste may be made with a clay, for example, of the kaolin group, the montmorillonite group, the variously named illite, bravaisite or hydromica group, Attapulgus and allophane.

The single sheet of drawing illustrates partially schematically a standing utility pole having a coating containing benzanthroneacridine being applied thereto so that the pole has a coating thereon.

As an actual illustration, a paste containing about 4% by weight of benzanthroneacridine in kaolin was prepared and applied to poles in the Houston, Texas, area where the poles were under severe attack from pileated woodpeckers. The preparation was applied by "pole climbers" equipped with paste applicators. The paste was applied to all holes, slits, and crevices that had been excavated by the woodpeckers and the particular transmission lines receiving this test treatment were currently under attack, most of these cavities having been freshly excavated. Twenty-one poles on a distribution line received this treatment, as well as eleven poles on a transmission line. Some two hundred holes or crevices in all received the treatment. After a period of six months from the first application of the clay preparation, only 5% of the holes treated showed any signs at all of renewed woodpecker attack, and this attack was extremely superficial in nature. In contrast to these treated poles, it was found in a controlled line of poles to which no repellent had been applied, woodpeckers returned within three months to carry out additional excavation on 38% of the holes which were previously attacked and the average amount of work at each hole was extensive.

It may be advantageous at times to impregnate the wood under pressure with a solution of benzanthroneacridine either alone or in combination with a generally well known wood preservative such as pentachlorophenol. Thus, benzanthroneacridine may be impregnated in the wood under pressure to provide a wood product containing the woodpecker repellent distributed throughout.

Generally, the method of application of the benzanthroneacridine to form the novel wood products of this invention is only limited by the particular requirements of the wood product to be protected. It is quite possible to prepare protected wood products in a commercial wood treating plant through a continuous dipping, coating or pressure impregnation process or if more convenient the standing transmission or distribution poles may be coated, for example, by spraying with using an aqueous dispersion or an alcohol dispersion of the benzanthroneacridine under pressure.

Pressure impregnation of wood is conveniently accomplished by "full" or "empty cell" technique. These are well known methods and are described, for example, in Wood Preservation, by George M. Hunt and George A. Garratt, 1938, McGraw-Hill Book Company, Inc. Other standard impregnation techniques known to the art can also be used, depending of course, on the physical nature of the wood. For example, impregnation may be accomplished by soaking, by vacuum impregnation at atmospheric pressure, by alternate application of pressure and vacuum, etc., or by the empty cell process. The empty cell process involves forcing the impregnating solution under pressure into wood containing air. The back pressure caused by compressing the air within the wood forces out part of the solution when the pressure is released.

I claim:

1. A wood article containing a benzanthroneacridine impregnated therein to repel woodpeckers from the article.

2. A wood article coated with a solid coating carrier containing a benzanthroneacridine to repel woodpeckers from the article.

References Cited in the file of this patent

UNITED STATES PATENTS

| | | |
|---|---|---|
| 995,936 | Wolff | June 20, 1911 |
| 1,739,840 | Kendall | Dec. 17, 1929 |
| 1,861,921 | Honold | June 7, 1932 |
| 1,909,386 | Wuertz | May 16, 1933 |
| 2,655,502 | Scalera et al. | Oct. 13, 1953 |
| 3,005,751 | Stansbury | Oct. 24, 1961 |